US007867639B2

(12) United States Patent
Raffaelle et al.

(10) Patent No.: US 7,867,639 B2
(45) Date of Patent: Jan. 11, 2011

(54) ALPHA VOLTAIC BATTERIES AND METHODS THEREOF

(75) Inventors: Ryne P. Raffaelle, Honeoye Falls, NY (US); Phillip Jenkins, Cleveland Heights, OH (US); David Wilt, Bay Village, OH (US); David Scheiman, Cleveland, OH (US); Donald Chubb, Olmsted Falls, OH (US); Stephanie Castro, Westlake, OH (US)

(73) Assignees: Rochester Institute of Technology, Rochester, NY (US); The United States of America as represented by the Administrator of National Aeronautics and Space Administration, Washington, DC (US)

( * ) Notice: Subject to any disclaimer, the term of this patent is extended or adjusted under 35 U.S.C. 154(b) by 1311 days.

(21) Appl. No.: 11/093,134

(22) Filed: Mar. 29, 2005

(65) Prior Publication Data

US 2005/0231064 A1 Oct. 20, 2005

Related U.S. Application Data

(60) Provisional application No. 60/557,993, filed on Mar. 31, 2004.

(51) Int. Cl.
*H01M 14/00* (2006.01)

(52) U.S. Cl. .......................................................... 429/5

(58) Field of Classification Search ............. 429/12–49; 257/659, 660

See application file for complete search history.

(56) References Cited

U.S. PATENT DOCUMENTS

| | | | | |
|---|---|---|---|---|
| 3,994,718 | A * | 11/1976 | Berndt et al. | 420/1 |
| 5,082,505 | A * | 1/1992 | Cota et al. | 136/253 |
| 5,859,484 | A * | 1/1999 | Mannik et al. | 310/303 |
| 6,479,743 | B2 * | 11/2002 | Vaz | 136/253 |

OTHER PUBLICATIONS

Sheila G. Gailey, David M. Wilt, Stephanie L. Castro, Cory D. Cress and Ryne P. Raffaelle, "Photovoltaic Development For Alpha Voltaic Batteries," 2005, NASA Glenn Research Center, pp. 106-109. (http://ieeexplore.ieee.org/iel5/9889/31426/01488080.pdf?arnumber=1488080).*

Pfann et al., "Radioactive and Photoelectric *p-n* Junction Power Sources," *Journal of Applied Physics* 25(11):1422-1434 (1954).

Rybicki, G., "Silicon Carbide Alphavoltaic Battery," *Proceedings of the 25th IEEE Photovoltaic Specialists Conference*, Washington D.C., pp. 93-96 (1996).

* cited by examiner

*Primary Examiner*—Dah-Wei D Yuan
*Assistant Examiner*—Maria J Laios
(74) *Attorney, Agent, or Firm*—Nixon & Peabody LLP

(57) ABSTRACT

An alpha voltaic battery includes at least one layer of a semiconductor material comprising at least one p/n junction, at least one absorption and conversion layer on the at least one layer of semiconductor layer, and at least one alpha particle emitter. The absorption and conversion layer prevents at least a portion of alpha particles from the alpha particle emitter from damaging the p/n junction in the layer of semiconductor material. The absorption and conversion layer also converts at least a portion of energy from the alpha particles into electron-hole pairs for collection by the one p/n junction in the layer of semiconductor material.

25 Claims, 4 Drawing Sheets

SCHEMATIC OF AN ALPHA VOLTAIC BATTERY

SCHEMATIC OF AN ALPHA VOLTAIC BATTERY

ALPHA VOLTAIC BATTERY PROTOTYPE OPERATING AT -135°C

ALPHA VOLTAIC BATTERIES AND METHODS THEREOF

This application claims the benefit of U.S. Provisional Patent Application Ser. No. 60/557,993 filed Mar. 31, 2004, which is hereby incorporated by reference in its entirety.

The subject matter of this application was made with support from the United States Government under NASA Grant No. NAG3-2595. The United States Government has certain rights.

FIELD OF THE INVENTION

The present invention generally relates to batteries and, more particularly, alpha voltaic batteries and methods thereof.

BACKGROUND

The concept of an alpha voltaic battery was proposed in 1954 as disclosed in W. G. Pfann and W. van Roosbroeck, Journal of Applied Physics, Volume 25, No. 11, pp. 1422-1434, November 1954, which is herein incorporated by reference. In an alpha voltaic battery a radioactive substance that emits energetic alpha particles is coupled to a semiconductor p/n junction diode. As the alpha particles penetrate into the p/n junction, they decelerate and give up their energy as electron-hole pairs. These electron-hole pairs are collected by the p/n junction and converted into useful electricity much like a solar cell.

The main reason alpha voltaic batteries are not commercially successful is that the alpha particles damage the semiconductor material so as to degrade its electrical performance in just a matter of hours as disclosed in G. C. Rybicki, C. V. Aburto, R. Uribe, Proceedings of the 25$^{th}$ IEEE Photovoltaic Specialists Conference, pp. 93-96, 1996, which is herein incorporated by reference.

SUMMARY

An alpha voltaic battery in accordance with embodiments of the present invention includes at least one layer of a semiconductor material comprising at least one p/n junction, at least one absorption and conversion layer on the at least one layer of semiconductor layer, and at least one alpha particle emitter. The absorption and conversion layer prevents at least a portion of alpha particles from the alpha particle emitter from damaging the p/n junction in the layer of semiconductor material. The absorption and conversion layer also converts at least a portion of energy from the alpha particles into electron-hole pairs for collection by the one p/n junction in the layer of semiconductor material.

A method for making an alpha voltaic battery in accordance with embodiments of the present invention includes providing at least one layer of a semiconductor material comprising at least one p/n junction, putting at least one absorption and conversion layer on the at least one layer of semiconductor layer, and providing at least one alpha particle emitter. The absorption and conversion layer prevents at least a portion of alpha particles from the alpha particle emitter from damaging the p/n junction in the layer of semiconductor material. The absorption and conversion layer also converts at least a portion of energy from the alpha particles into electron-hole pairs for collection by the p/n junction in the layer of semiconductor material.

A method for generating power in accordance with embodiments of the present invention includes emitting alpha particles from an alpha particle emitter into at least one absorption and conversion area. At least a portion of the emitted alpha particles from the alpha particle emitter are prevented from damaging the p/n junction in the layer of semiconductor material with the absorption and conversion layer. At least a portion of energy from the alpha particles is converted into electron-hole pairs for collection by the p/n junction in the layer of semiconductor material.

The present invention provides alpha voltaic batteries whose performance does not degrade in a matter of hours because of damage to the layer of semiconductor material from the emitted alpha particles. The present invention also provides power supplies which are both small and have a long life span and thus are suitable for a variety of technologies, including micro electrical mechanical systems (MEMS). Further, the alpha voltaic batteries in accordance with the present invention can be scaled to higher power levels which make them useful in another wide range of technologies, such as a power source of deep space missions.

DETAILED DESCRIPTION

Alpha voltaic batteries 10(1) and 10(6) in accordance with embodiments of the present invention are illustrated in FIGS. 1-3D. The batteries 10(1)-10(6) each include an intermediate or absorption and conversion layer 12(1)-12(6) with an alpha particle emitter or source 14(1)-14(6) and one or more layers of semiconductor material 18(1)-18(6) and 22(1)-22(3), although the batteries 10(1)-10(6) can each comprise other numbers and types of elements in other configurations. The present invention provides alpha voltaic batteries whose performance does not degrade in a matter of hours because of damage to the layer semiconductor material from the alpha particles.

Figure 1:
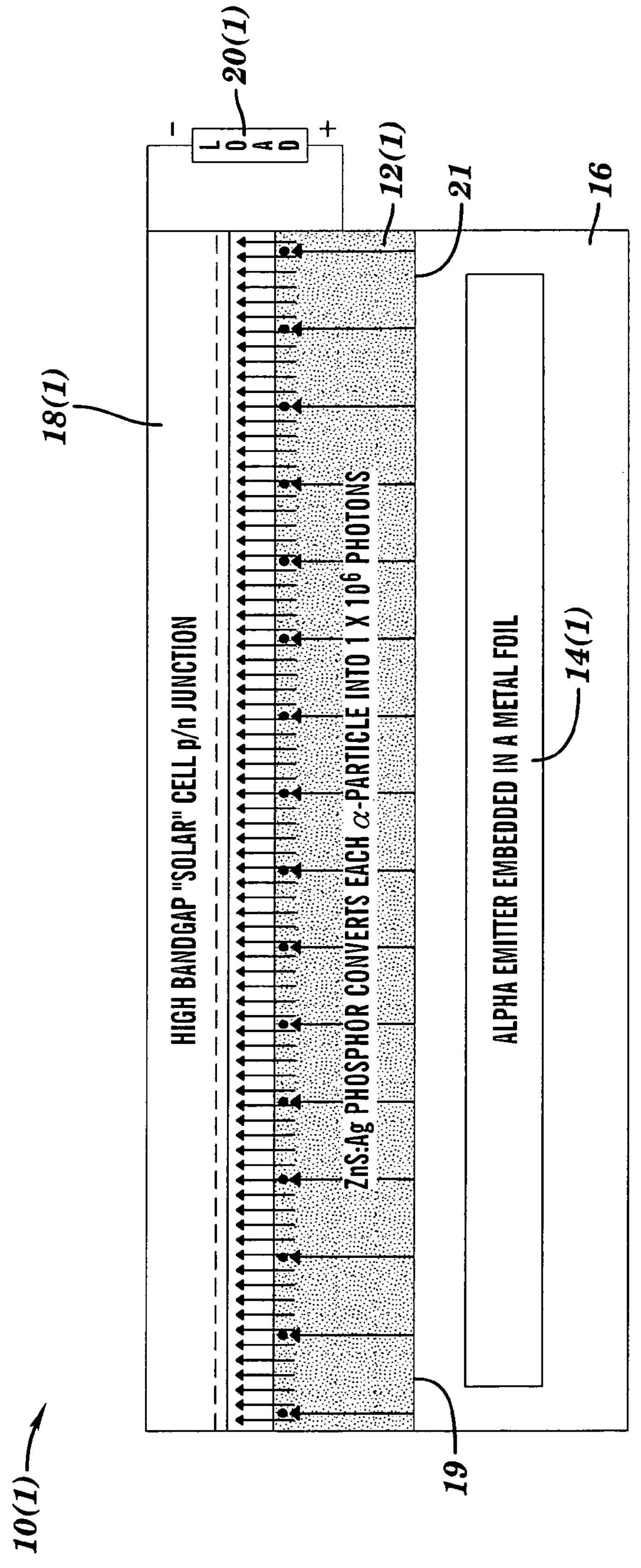
FIG. 1 is a partial side, cross sectional and partial schematic diagram of an alpha voltaic battery in accordance with embodiments of the present invention.

Referring more specifically to FIG. 1, an alpha voltaic battery 10(1) in accordance with embodiments of the present invention is illustrated. The alpha particle emitter 14(1) emits energetic alpha particles which are converted by the alpha voltaic battery 10(1) into energy. The alpha particle emitter 14(1) is embedded in a metal foil 16, although the alpha particle emitter 14(1) could be embedded or connected to other types and numbers of layers of material or materials in other configurations, such as in the absorption and conversion layer 12(2) as shown and described with reference to FIG. 2. Referring back to FIG. 1, in these embodiments the alpha particle emitter 14(1) comprises Am-241 which is thermally diffused in the metal foil 16 and is then over-coated with another metal, such as silver, to form the metal foil 16 with the embedded alpha particle emitter 14(1), although other types of alpha particle emitters which are embedded or configured in other manners could be used.

The intermediate or absorption and conversion layer 12(1) is deposited on the metal foil 16 with the embedded alpha particle emitter 14(1), although other types and numbers of absorption and conversion layers in other configurations could be used. The absorption and conversion layer 12(1) prevents alpha particles from the alpha particle emitter 14(1) from damaging one or more p/n junctions in the layer of semiconductor material 18(1). The absorption and conversion layer 12(1) also successfully converts the photons or energy from the alpha particles into electron-hole pairs for collection by the p/n junction in the layer of semiconductor material 18(1). The thickness of the absorption and conversion layer 12(1) depends upon the energy or the alpha particles and the resulting penetration depth in the absorption and conversion layer 12(1). The thickness of the absorption and conversion layer 12(1) can be chosen to prevent any radiation damage to the layer of semiconductor material 18(1) or to permit partial amounts of the energy to be deposited into the layer of semiconductor material 18(1) and to decrease the self-absorption of photons by absorption and conversion layer 12(1). For example, a thickness of the absorption and conversion layer 12(1) can be determined and selected to achieve a desired minimum lifespan for the battery 10(1)-10(6) and power output by providing a sufficient thickness to protect the layer of semiconductor material 18(1) while permitting a sufficient amount of the photons to reach the layer of semiconductor material 18(1) for conversion to power.

In these embodiments the absorption and conversion layer 12(1) comprises a layer of phosphor, such as ZnS:Ag, which fluoresces photons of approximately 2.66 eV (465 nm wavelength) in energy, although other types and numbers of absorption and conversions layers could be used. By way of example only, other materials which could be used for the absorption and conversion layer 12(1) include rare earth oxides or rare earth doped garnet crystals and nanoscale materials known as "quantum dots" that exhibit flourescence under particle radiation, although other types of materials could be used. Materials that fluoresce under particle radiation, collectively known as phosphors, can convert particle radiation into photons with very high efficiency.

The alpha particle emitter 14(1) is placed adjacent the absorption and conversion layer 12(1) and is embedded in the metal foil 16 as shown in FIG. 1, although other numbers and types of elements in other arrangements can be used. By way of example only, other arrangements for alpha particle emitters 14(3)-14(6) are illustrated in alpha voltaic batteries 10(3)-10(6) shown in FIGS. 3A-3D. Alpha voltaic batteries 10(3)-10(6) have a like structure and operation as the corresponding alpha voltaic batteries 10(1) and 10(2), except as described herein. Additionally, elements in FIGS. 3A-3D which are like those in FIGS. 1 and 2 have like reference numerals.

Figure 3A:
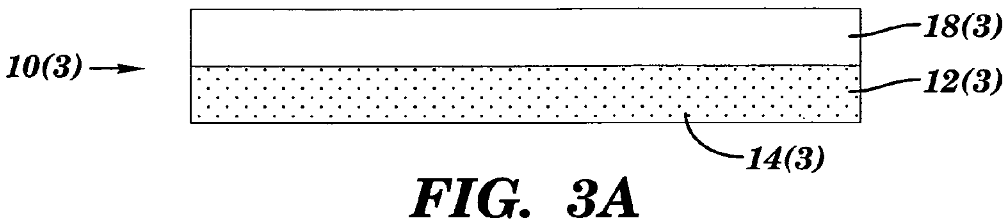
FIGS. 3A-3D are side, cross sectional views of alpha voltaic battery in accordance with embodiments of the present invention.
Figure 3B:
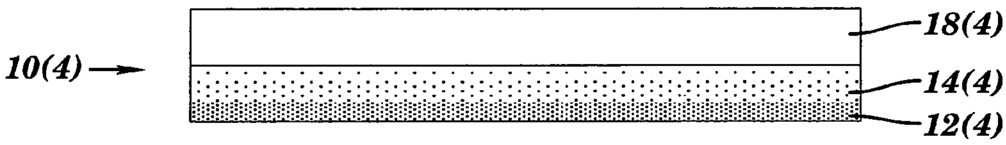
Figure 3C:
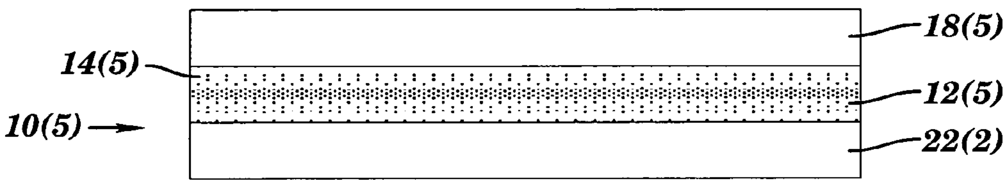
Figure 3D:
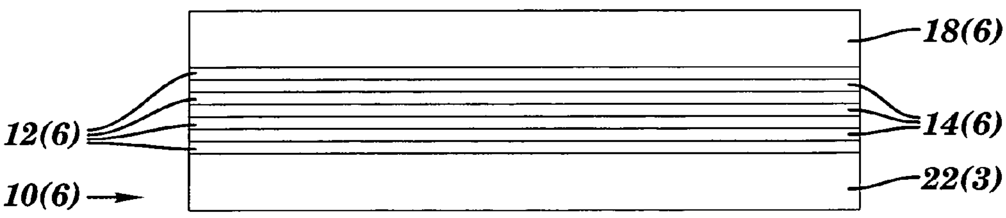

Referring to FIG. 3A, the alpha particle emitter 14(3), which for illustration purposes only is illustrated as dots, is distributed homogeneously throughout the absorption and conversion layer 12(3) which is adjacent the layer of semiconductor material 18(3) with a p/n junction. Referring to FIG. 3B, the alpha particle emitter 14(4), which for illustration purposes only is illustrated as dots, is distributed in a graded fashion throughout the absorption and conversion layer 12(4) with proportionally less alpha emitting material as the absorption and conversion layer 12(4) nears the layer of semiconductor material 18(4) with the p/n junction. Distributing the alpha particle emitter 14(4) in a graded fashion with less near the layer of semiconductor material 18(4) helps to make an effective battery 10(4) while minimizing any possible radiation to the layer of semiconductor material 18(4). Similarly, referring to FIG. 3C, the alpha particle emitter 14(5), which for illustration purposes only is illustrated as dots, is distributed in a graded fashion throughout the absorption and conversion layer 12(5) with proportionally less alpha emitting material as the absorption and conversion layer 12(5) nears each of the layers of semiconductor material 18(5) and 22(2) with the p/n junction. Referring to FIG. 3D, the alpha particle emitter 14(6) and the absorption and conversion layer 12(6) are in a multilayered film arrangement between the layers of semiconductor material 18(6) and 22(3), although other numbers of layers of alpha particle emitters, absorption and conversion layers, and/or layers of semiconductor material could be used.

Referring back to FIG. 1, an interface 19 between the base layer 16 with the alpha particle emitter 14(1) and the absorption and conversion layer 12(1) is substantially reflective of the photons emitted by the absorption and conversion layer 14(1). With this reflection at the interface 19, the photons emitted by the absorption and conversion layer 14(1) towards the base layer 16 are be reflected to the p/n junction in the layer of semiconductor material 18(1) for collection. The natural reflectivity of alpha particle emitter 14(1) will cause reflection, although other ways of achieving the desired reflectivity can be used, such as an optional thin metal coating 21 on the metal foil 16 at the interface 19, although other numbers and types of at least partially reflective coatings at other locations can be used. By way of example only, the coating 21 could be the normal gold coating applied to seal most solid sample sources. The reflectivity of the surface of the metal foil 16 is directly related to the thickness of the metal foil 16, but the thickness will be inversely proportional to the amount of alpha energy which it passes.

The layer of semiconductor material 18(1) is deposited on a surface of the absorption and conversion layer 12(1), although other types and numbers of layers of semiconductor material in other configurations could be used. In these embodiments, the layer of semiconductor material 18(1) with the p/n junction is a high bandgap "solar cell", although other numbers of p/n junctions could be used. By way of example only, the types of layers of semiconductor materials which could be used include, by way of example only, GaAs, GaInP, SiC, Si, or other III-V, II-VI or group IV semiconductors. The layer of semiconductor material 18(1) has a high bandgap ranging between about 1 eV and about 3 eV, although the high bandgap for the layer of semiconductor material 18(1) could have other ranges.

The operation of the alpha voltaic battery 10(1) will now be described with reference to FIG. 1. Alpha particles emitted from the alpha particle emitter 14(1) embedded in the metal foil 16 are emitted into the absorption and conversion layer 12(1). The alpha particles decelerate in the absorption and conversion layer 12(1) creating electron-hole pairs. Instead of being collected by a p/n junction in the layer of semiconductor material 18(1), the electron-hole pairs in the absorption and conversion layer 12(1) simply recombine and emit photons.

The emitted photons in the absorption and conversion layer 12(1) are either emitted towards the layer of semiconductor material 12(1) or are substantially reflected at the interface between the metal foil 16 and the absorption and conversion layer 12(1) towards the layer of semiconductor material 12(1). Since the photons have energy greater than the bandgap of the p/n junction in the layer of semiconductor material 18(1), the photons are absorbed in the p/n junction layer of semiconductor material 12(1) creating electron-hole pairs that are converted into useful electricity. This generated electricity or power is transferred to a load 20(1) which is coupled between the absorption and conversion layer 12(1) and the layer of semiconductor material 18(1) across the p/n junction. Accordingly, with the absorption and conversion layer 12(1), the p/n junction in the layer of semiconductor material 18(1) is protected from the harmful effects of the alpha particles from the alpha emitter 14(1), but still recovers the energy from the alpha radiation which is converted to useful power.

Figure 2:
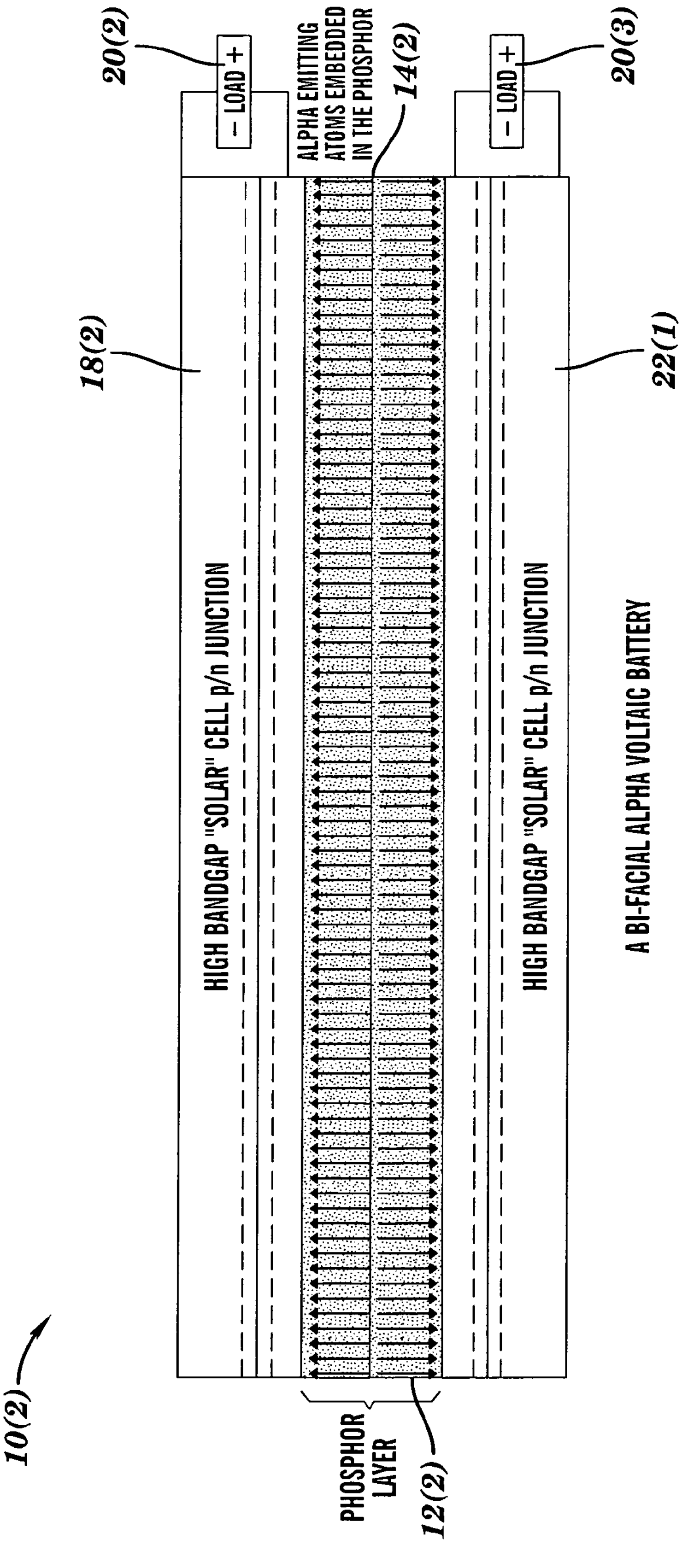
FIG. 2 is a partial side, cross sectional and partial schematic diagram of a bi-facial alpha voltaic battery in accordance with other embodiments of the present invention.

Referring to FIG. 2, a schematic diagram of a bi-facial alpha voltaic battery 10(2) in accordance with other embodiments of the present invention is illustrated. The alpha particle emitter 14(2) emits energetic alpha particles which are converted by the alpha voltaic battery 10(2) into energy. The alpha particle emitter 14(2) is embedded in an absorption and conversion layer 12(2), although the alpha particle emitter 14(2) could be embedded or connected to other types and numbers of layers of material or materials in other configurations. For example, the alpha particle emitter 14(2) could be in a multilayered film between the layers of semiconductor material 18(2) and 22(1) comprising with alternating layers of the alpha particle emitter and the absorption and conversion layer. In another embodiment, the alpha particle emitter 14(2) could be distributed homogeneously throughout the absorption and conversion layer 12(2). In yet another embodiment, the alpha particle emitter 14(2) could be distributed in a graded fashion throughout the absorption and conversion layer 12(2) with proportionally less alpha emitting material as the absorption and conversion layer 12(1) nears each of the layers of semiconductor material 18(2) and 22(1). Distributing the alpha particle emitter 14(2) in a graded fashion with less near each of the layers of semiconductor material 18(2) and 22(1) helps to make an effective battery while minimizing any possible radiation to each of the layers of semiconductor material 18(2) and 22(1). In these embodiments the alpha particle emitter 14(2) comprises Am-241 which is thermally diffused in the absorption and conversion layer 12(2), although other types of alpha particle emitters which are embedded or configured in other manners could be used.

The absorption and conversion layer 12(2) comprises a single layer between layers of semiconductor material 18(2) and 22(1), although other types and numbers of absorption and conversion layers in other configurations could be used. The absorption and conversion layer 12(2) prevents alpha particles from the alpha particle emitter 14(2) from damaging one or more p/n junctions in the layers of semiconductor material 18(2) and 22(1). The absorption and conversion layer 12(2) also successfully converts the photons or energy from the alpha particles into electron-hole pairs for collection by the p/n junction in each of the layers of semiconductor material 18(2) and 22(1). The absorption and conversion layer 12(2) comprises a single layer of phosphor, although again like the absorption and conversion layer 14(1), the absorption and conversion layer 12(2) can have other types and numbers of layers in other configurations, such as a multilayer design alternating with layers of the alpha particle emitter between or a composite of the alpha particle emitter and the absorption and conversion layer in which the alpha particle emitter is homogeneously or graded throughout the absorption and conversion layer 12(2). The number of layers and/or composition and material distribution depends on the particular material used for absorption and conversion layer 12(2) and the particular alpha source material utilized for the alpha particle emitter 14(2). The absorption and conversion layer 12(2) and the alpha particle emitter 14(2) are combined to provide the maximum photon output to the surrounding layers of semiconductor materials 18(2) and 22(1), while minimizing any damage to the layers of semiconductor materials 18(2) and 22(1) and to the absorption and conversion layer 12(2).

In these embodiments the absorption and conversion layer 12(2) comprises a layer of phosphor, such as ZnS:Ag, which fluoresces photons of approximately 2.66 eV (465 nm wavelength) in energy, although other types and numbers of absorption and conversions layers could be used. By way of example only, other materials which could be used for the absorption and conversion layer 12(2) include rare earth oxides or rare earth doped garnet crystals and nanoscale materials known as "quantum dots" that exhibit fluorescence under particle radiation, although other types of materials could be used. Materials that fluoresce under particle radiation, collectively known as phosphors, can convert particle radiation into photons with very high efficiency.

The layers of semiconductor material 18(2) and 22(1) are deposited on opposing surfaces of the absorption and conversion layer 12(2), although other types and numbers of layers of semiconductor material in other configurations could be used. In these embodiments, each of the layers of semiconductor material 18(2) and 22(1) have a p/n junction and comprise a high bandgap "solar cell", although other numbers of p/n junctions could be used in each of the layers of semiconductor material 18(2) and 22(1). By way of example only, the types of layers of semiconductor materials which could be used include, by way of example only, GaAs, GaInP, SiC, Si, or other III-V, II-VI or group IV semiconductors. Each of the layers of semiconductor material 18(2) and 22(1) has a high bandgap ranging between about 1 eV and about 3 eV, although the high bandgap for each of the layers of semiconductor material 18(2) and 22(1) could have other ranges.

The operation of the alpha voltaic battery 10(2) will now be described with reference to FIG. 2. Alpha particles emitted from the alpha particle emitter 14(2) embedded in the absorption and conversion layer 12(2) are emitted into the absorption and conversion layer 12(2). The alpha particles decelerate in the absorption and conversion layer 12(2) creating electron-hole pairs. Instead of being collected by the p/n junction in each of the layers of semiconductor material 18(2) and 22(1), the electron-hole pairs in the absorption and conversion layer 12(2) simply recombine and emit photons.

The emitted photons in the absorption and conversion layer 12(2) are either emitted towards the layer of semiconductor material 18(2) or towards the layer of semiconductor material 22(1). Since the photons have energy greater than the bandgap of the p/n junction in each of the layers of semiconductor material 18(2) and 22(1), the photons are absorbed in the p/n junction in each of the layers of semiconductor material 18(2) and 22(1) creating electron-hole pairs that are converted into useful electricity. This generated electricity or power is transferred to loads 20(2) and 20(3). Load 20(2) is coupled across the p/n junction of the layer of semiconductor material 18(2) and load 20(3) is coupled across the p/n junction of the layer of semiconductor material 22(1). Accordingly, with the absorption and conversion layer 12(2), the p/n junction in each of the layers of semiconductor material 18(2) and 22(1) is protected from the harmful effects of the alpha particles from the alpha emitter 14(2), but still recovers the energy from the alpha radiation.

The emerging technologies of micro electrical mechanical systems (MEMS) are a perfect application for alpha voltaic batteries in accordance with the present invention. The present invention provides a long life power source that simply did not exist for these devices prior to this invention. Additionally, the present invention is very suitable for integrating batteries directly on the semiconductor for a "batteryon-a-chip" concept. Alpha voltaic batteries in accordance with the present invention could produce power on the order of micro-Watts, sufficient for many MEMS applications.

Figure 4:
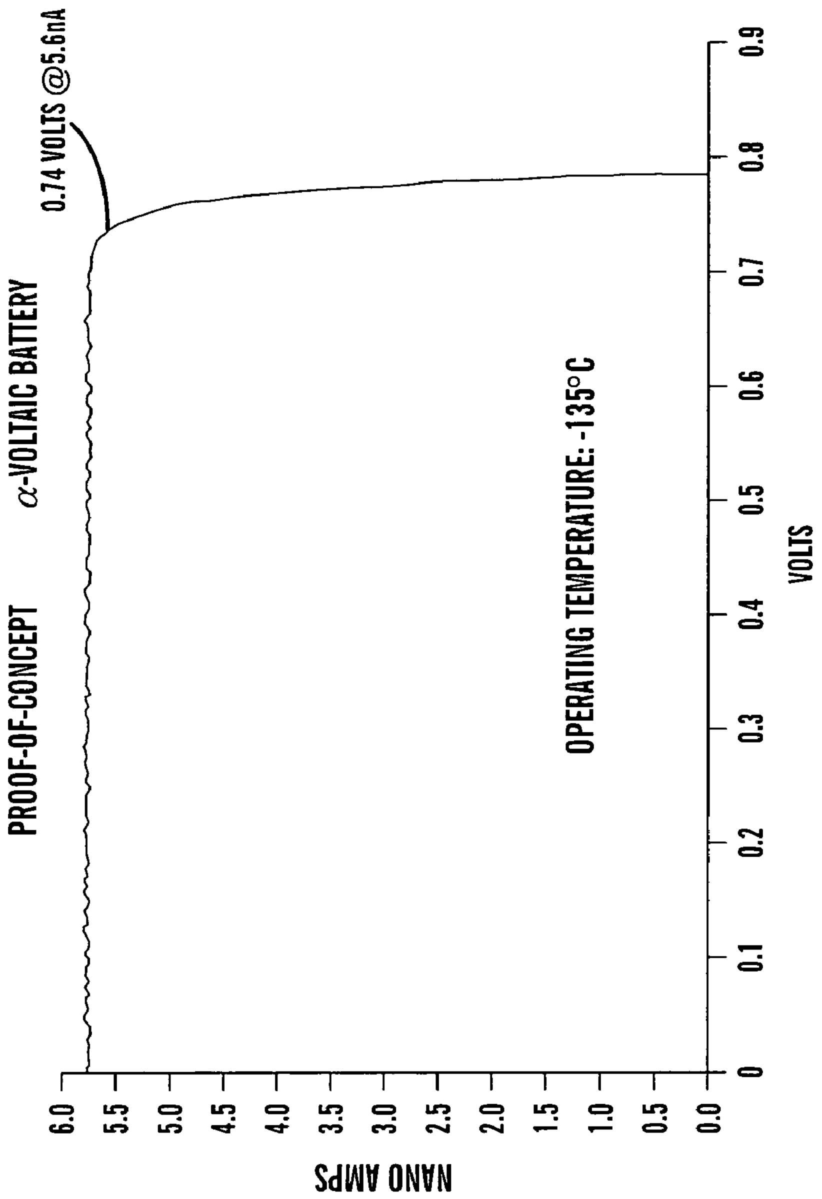
FIG. 4 is a graph of Nano Amps v. Volts for a prototype of an alpha voltaic battery operating at temperatures down to about −135° C.

With the present invention, scaling to higher power levels suitable for deep space missions (100's of Watts) is also possible. Alpha voltaic batteries in accordance with the present invention have at least two unique properties when compared to conventional chemical batteries that make them outstanding candidates for deep space missions: 1) The alpha emitting materials have half-lives from months to 100's of years, so there is the potential for "everlasting" batteries; and 2) Alpha voltaic batteries in accordance with the present invention can operate over a tremendous temperature range. Ordinary chemical batteries all fail at temperatures below −40° C., while alpha voltaic batteries in accordance with the present invention have been demonstrated to work at −135° C. as illustrated in the current (I)-voltage (V) graph in FIG. 4 for a prototype of an alpha voltaic battery.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. An alpha voltaic battery comprising:

at least one layer of a semiconductor material comprising at least one p/n junction;

at least one absorption and conversion layer on the at least one layer of semiconductor material, wherein the absorption and conversion layer comprises at least a fluorescent material; and at least one alpha particle emitter, wherein the at least one absorption and conversion layer prevents at least a portion of alpha particles from the at least one alpha particle emitter from damaging the at least one p/n junction in the at least one layer of semiconductor material and converts at least a portion of energy from the alpha particles into electron-hole pairs for collection by the at least one p/n junction in the at least one layer of semiconductor material.

2. The battery as set forth in claim 1 wherein the at least one alpha particle emitter is embedded in at least one base layer, wherein the at least one absorption and conversion layer is on the at least one base layer and between the at least one base layer with the alpha particle emitter and the at least one layer of a semiconductor material.

3. The battery as set forth in claim 2 wherein an interface between the at least one absorption and conversion layer and the at least one base layer is at least partially reflective.

4. The battery as set forth in claim 3 further comprising at least one coating at the interface which provides the at least partial reflectivity.

5. The battery as set forth in claim 1 wherein the at least one alpha particle emitter is embedded in at least a portion of the at least one absorption and conversion layer.

6. The battery as set forth in claim 5 wherein the at least one alpha particle emitter is substantially homogeneously disbursed through the at least one absorption and conversion layer.

7. The battery as set forth in claim 5 wherein the at least one alpha particle emitter is disbursed through the at least one absorption and conversion layer in a graded manner with proportionally less of the at least one alpha particle emitter near the at least one layer of semiconductor material.

8. The battery as set forth in claim 1 wherein the at least one alpha particle and the at least one absorption and conversion layer comprise a plurality of alternating layers.

9. The battery as set forth in claim 1 wherein the absorption and conversion layer comprises at least one of a rare earth oxide, a rare earth doped garnet crystal, and quantum dots.

10. The battery as set forth in claim 1 wherein the at least one layer of semiconductor material has a high bandgap ranging between about 1 eV and about 3 eV.

11. The battery as set forth in claim 1 further comprising at least one other layer of a semiconductor material with at least one p/n junction disposed on another surface of the at least one absorption and conversion layer.

12. An alpha voltaic battery comprising:

at least one layer of a semiconductor material comprising at least one p/n junction;

at least one absorption and conversion layer separate from the at least one layer of semiconductor material, the absorption and conversion layer comprises at least one layer of a fluorescent material; and at least one alpha particle emitter, wherein the at least one absorption and conversion layer prevents at least a portion of alpha particles from the at least one alpha particle emitter from damaging the at least one p/n junction in the at least one layer of semiconductor material and converts at least a portion of energy from the alpha particles into electron-hole pairs for collection by the at least one p/n junction in the at least one layer of semiconductor material.

13. An alpha voltaic battery comprising:

at least one layer of a semiconductor material comprising at least one p/n junction;

at least one absorption and conversion layer separate from the at least one layer of semiconductor material, wherein the absorption and conversion layer comprises one of a rare earth oxide, a rare earth doped garnet crystal, and quantum dots; and at least one alpha particle emitter, wherein the at least one absorption and conversion layer prevents at least a portion of alpha particles from the at least one alpha particle emitter from damaging the at least one p/n junction in the at least one layer of semiconductor material and converts at least a portion of energy from the alpha particles into electron-hole pairs for collection by the at least one p/n junction in the at least one layer of semiconductor material.

14. An alpha voltaic battery comprising:

at least one layer of a semiconductor material comprising at least one p/n junction;

at least one absorption and conversion layer on the at least one layer of semiconductor material; and at least one alpha particle emitter, wherein the at least one absorption and conversion layer prevents at least a portion of alpha particles from the at least one alpha particle emitter from damaging the at least one p/n junction in the at least one layer of semiconductor material and fluoresces photons in response to at least a portion of energy from the alpha particles for collection by the at least one p/n junction in the at least one layer of semiconductor material.

15. The battery as set forth in claim 14 wherein the at least one alpha particle emitter is embedded in at least one base layer, wherein the at least one absorption and conversion layer is on the at least one base layer and between the at least one base layer with the alpha particle emitter and the at least one layer of a semiconductor material.

16. The battery as set forth in claim 15 wherein an interface between the at least one absorption and conversion layer and the at least one base layer is at least partially reflective.

17. The battery as set forth in claim 16 further comprising at least one coating at the interface which provides the at least partial reflectivity.

18. The battery as set forth in claim 14 wherein the at least one alpha particle emitter is embedded in at least a portion of the at least one absorption and conversion layer.

19. The battery as set forth in claim 18 wherein the at least one alpha particle emitter is substantially homogeneously disbursed through the at least one absorption and conversion layer.

20. The battery as set forth in claim 18 wherein the at least one alpha particle emitter is disbursed through the at least one absorption and conversion layer in a graded manner with proportionally less of the at least one alpha particle emitter near the at least one layer of semiconductor material.

21. The battery as set forth in claim 14 wherein the at least one alpha particle and the at least one absorption and conversion layer comprise a plurality of alternating layers.

22. The battery as set forth in claim 14 wherein the absorption and conversion layer comprises at least a fluorescent material.

23. The battery as set forth in claim 14 wherein the absorption and conversion layer comprises at least one of a rare earth oxide, a rare earth doped garnet crystal, and quantum dots.

24. The battery as set forth in claim 14 wherein the at least one layer of semiconductor material has a high bandgap ranging between about 1 eV and about 3 eV.

25. The battery as set forth in claim 14 further comprising at least one other layer of a semiconductor material with at least one p/n junction disposed on another surface of the at least one absorption and conversion layer.

* * * * *